March 28, 1967  R. W. MILLER  3,311,415
STONE SAW WITH PULSED FEED FOR CHAIN CUTTER
Filed Oct. 19, 1964  4 Sheets-Sheet 1
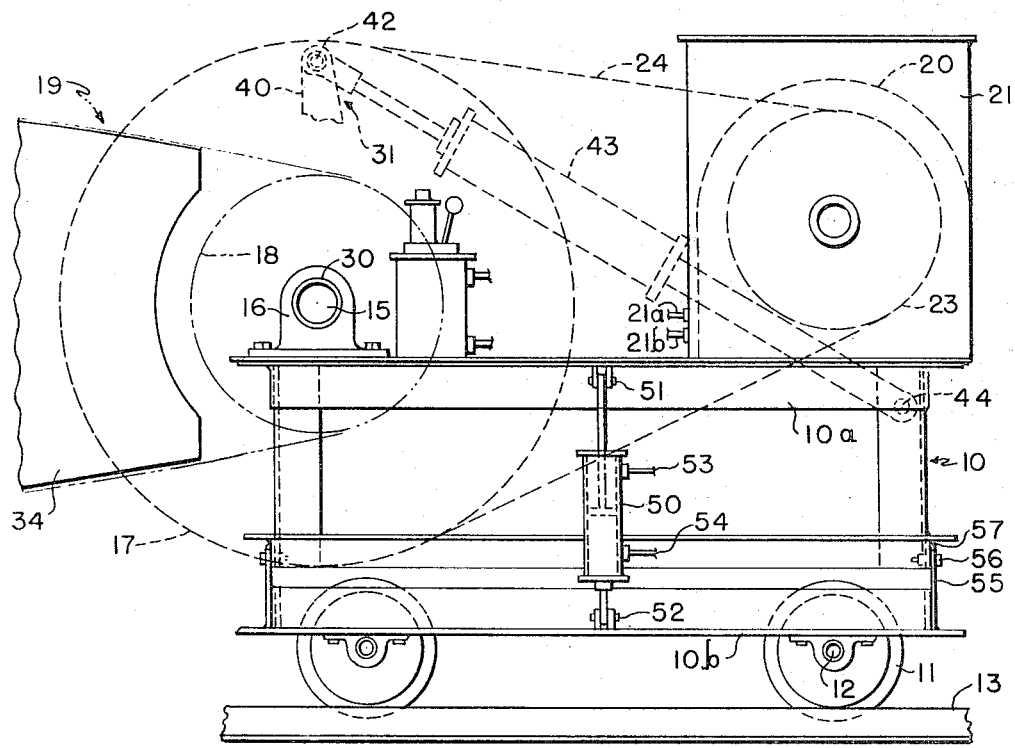
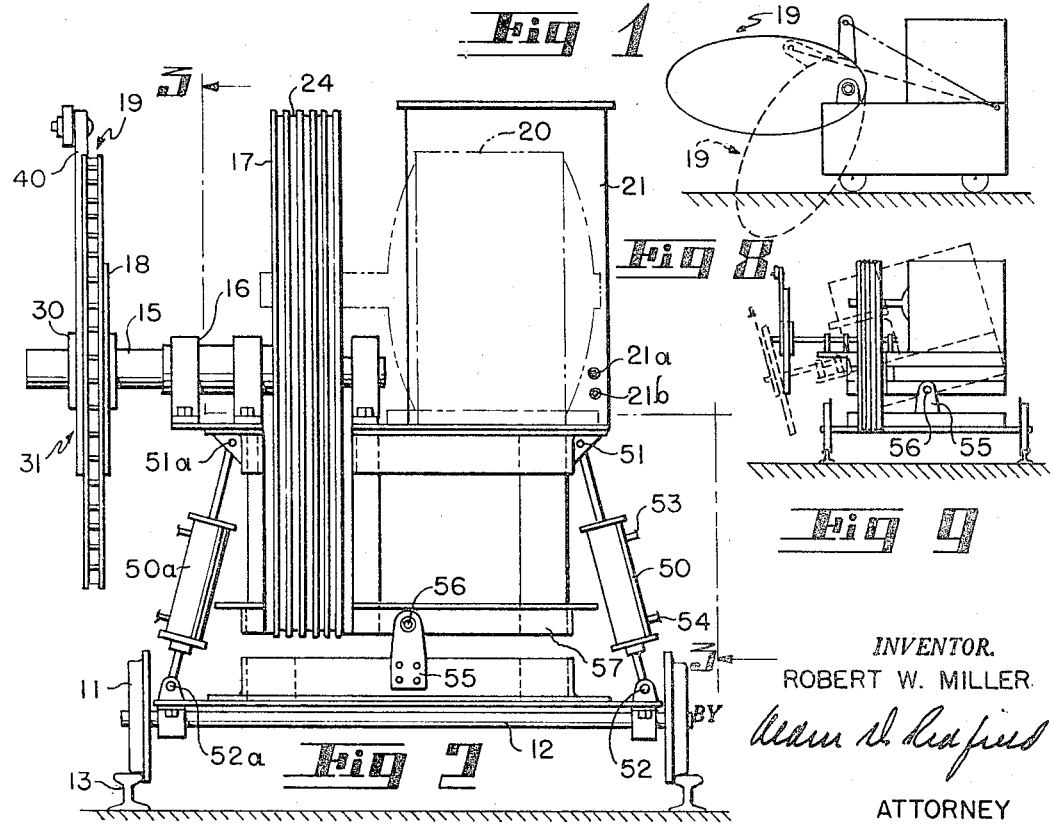
INVENTOR.
ROBERT W. MILLER
ATTORNEY

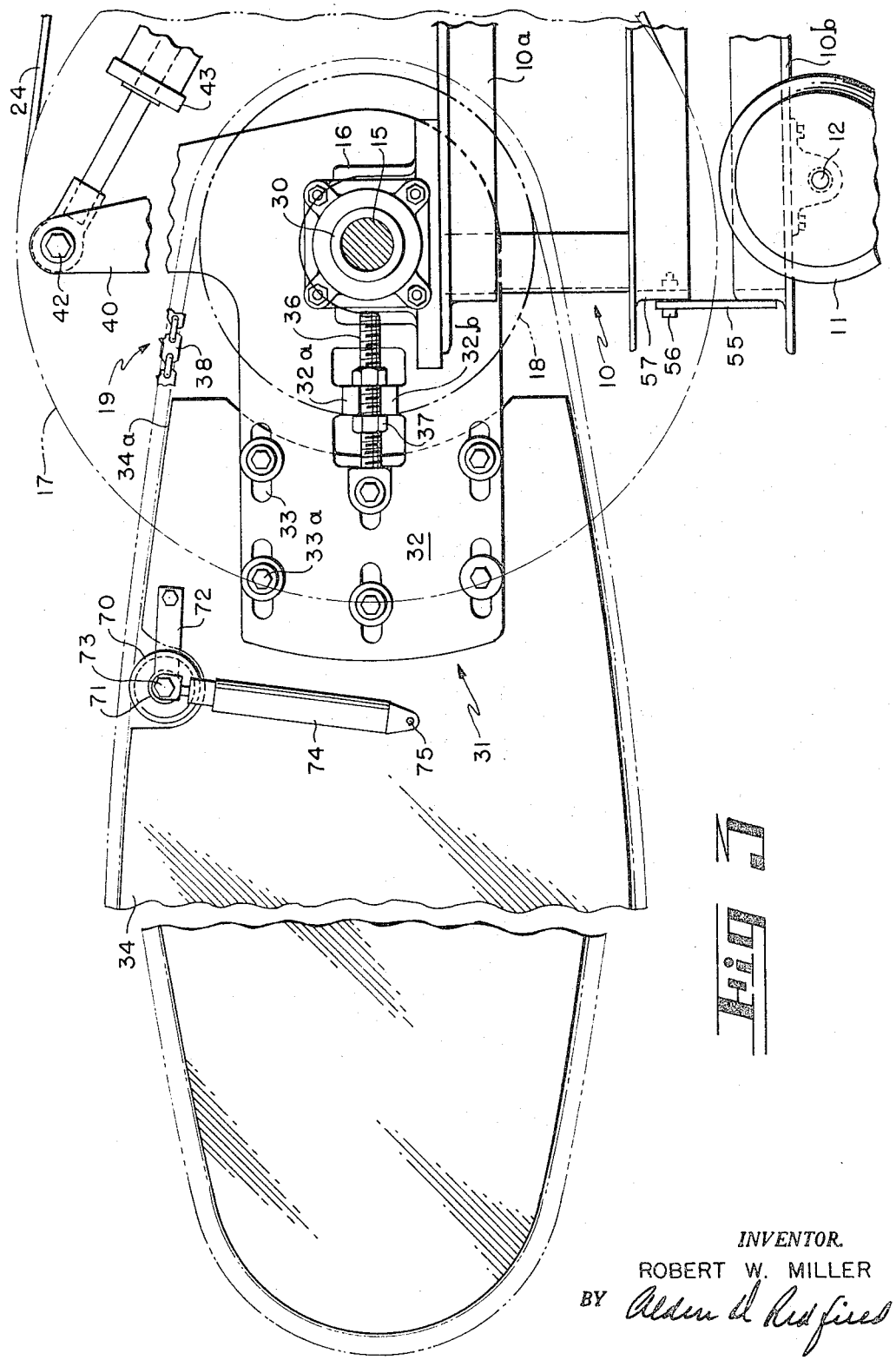

March 28, 1967 R. W. MILLER 3,311,415
STONE SAW WITH PULSED FEED FOR CHAIN CUTTER
Filed Oct. 19, 1964 4 Sheets-Sheet 3

INVENTOR.
ROBERT W. MILLER
BY
ATTORNEY.

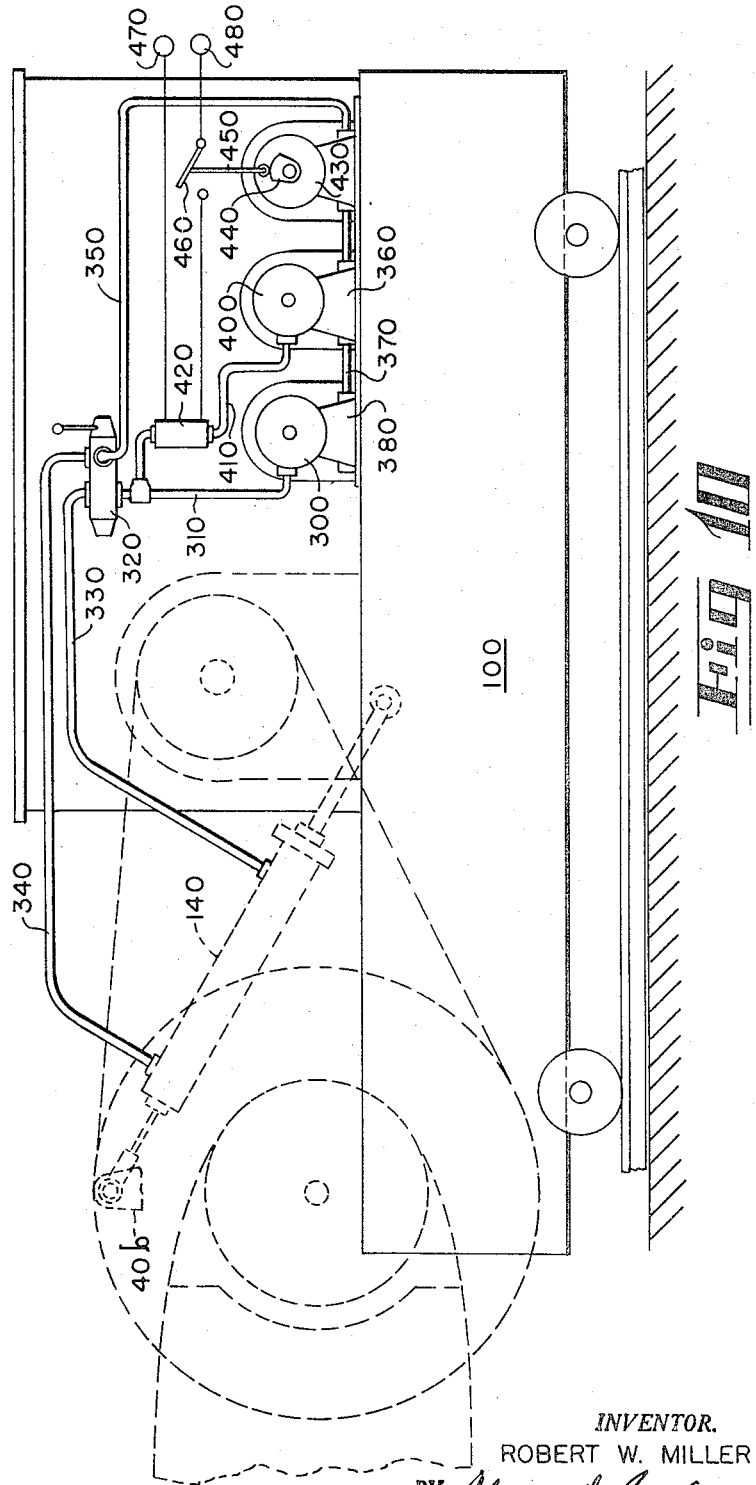

3,311,415
STONE SAW WITH PULSED FEED
FOR CHAIN CUTTER
Robert W. Miller, Cincinnati, Ohio, assignor to Alaskaug Inc., Cincinnati, Ohio, a corporation of Ohio
Filed Oct. 19, 1964, Ser. No. 404,779
5 Claims. (Cl. 299—36)

This invention relates to the art of cutting stone and has for its primary object the provision of an apparatus by which stone may be cut from the quarry without following the tedious, expensive, inefficient and sometimes dangerous methods of drilling, blasting and sawing. The invention, however, is applicable for use on stone that has been extracted from its natural situs by prior art methods.

Another object is to provide an apparatus with which stone may be chipped and abraded away in a selected plane, the chipping and abrasion being accomplished at high speed with the simultaneous application of hydraulic pressure applied with the mechanical advantage of a lever system.

Other objects and advantages of the invention will more clearly appear when reference is had to the accompanying specification and drawings.

Briefly described, the invention comprises a unique chain saw for cutting stone with appropriate bits mounted on alternate links of the chain. The bits are formed of hard material such as tungsten carbide and are moved at a high linear velocity against the stone in a selected plane. Hydraulic pressure is simultaneously applied to all the bits working in such plane, with the abrading action always in alignment with the plane of the saw and with such pressure being continued until the saw reaches its maximum limit of movement. Such pressure may, in accordance with the invention, be varied within wide limits, and are intensified by applying them through a lever system.

In the drawings,

FIG. 1 is a side elevation with parts broken away for clarity of an illustrative apparatus incorporating the invention;

FIG. 2 is an end elevational view thereof;

FIG. 3 is an enlarged fragmentary section taken along lines 3—3 of FIG. 2, with certain parts which are not essential to an understanding of the operation and function of the invention, omitted;

FIG. 8 is a schematic side elevation showing a working position and an extreme position of the saw;

FIG. 9 is a schematic and elevation showing means for varying the plane in which the saw operates; and FIG. 10 is a schematic side elevation of a modified apparatus.

Figure 4:
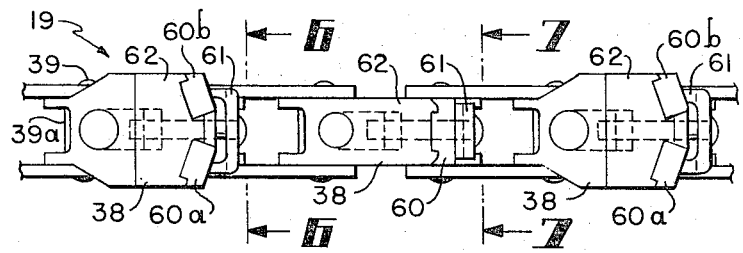
FIG. 4 is a fragmentary plan view of a chain construction which may be utilized in accordance with the invention.
Figure 5:
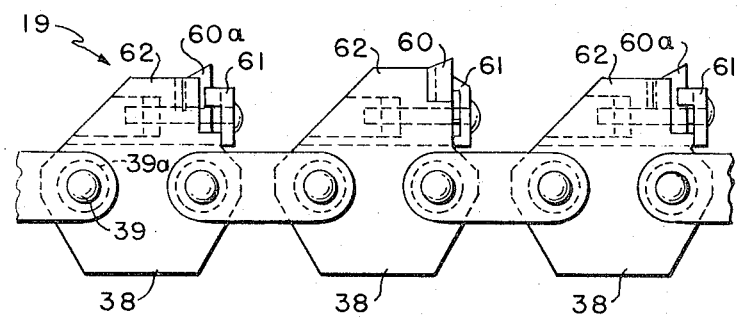
FIG. 5 is a side elevational view of the chain of FIG. 4.
Figures 6, 7:
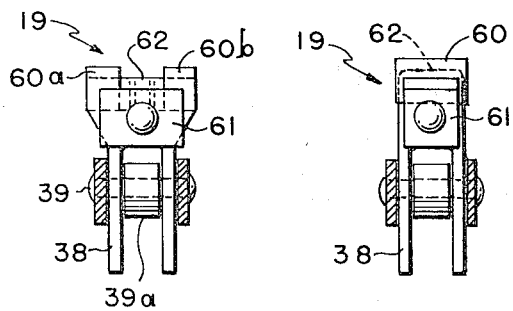
FIGS. 6 and 7 are sectional views along the lines indicated on FIG. 5.

The embodiment illustrated in FIGS. 1–9 is supported in a framework 10, and may desirably be movably mounted on wheels 11 carried by axles 12. For illustration, the wheels may be flanged wheels running on tracks 13 which are laid adjacent the point in the quarry where operations are to be begun. For purposes hereinafter described, frame 10 comprises an upper section 10a and a lower section 10b.

On the frame 10a is mounted a cross shaft 15 journaled in pillow blocks 16. Keyed to one end of the shaft 15 is a gang pulley 17 and to the other end a sprocket wheel 18 for drivingly supporting chain 19.

On the other end of frame 10a is mounted an electric motor 20 which may be enclosed within an appropriate housing 21 and connected to a suitable source of power through leads 21a and 21b through a control box shown diagrammatically at 22. The connections and controls may comprise standard electrical equipment and need not be described except to note that they must service a motor of large horse power and be capable of handling heavy currents and high wattages. The motor is provided with a gang pulley 23 and connected by a series of V-belts 24 which transmit power to pulley 17 to the drive sprocket wheel 18 for chain 19.

Rotatably journaled on shaft 15 in bearings 30 is a sturdy crank lever 31, one arm 32 of which is provided with slots 33 through which it is adjustably mounted as by stud bolts 33a to chain guide 34 around which the chain 19 travels, alternate links 38 of the chain straddling guide rail 34a. Between the arms of links 38 are pins 39 on which are journaled rollers 39a to facilitate the travel of the links around the guide. Chain guide 34 may also be adjusted with respect to shaft 15 by stub shaft 36 extending through lugs 32a and 32b and secured by lock nuts 37 in a manner well understood in the art.

The other arm 40 of lever 31 is connected to one end 42 of a hydraulic ram 43. The other end of ram 43 is suitably secured as at 44 to a fixed point in the frame 10a. Suitable connections (not shown) well known in the art are provided to supply hydraulic fluid to the ram for the purpose of exerting heavy pressure, up to 20,000 lbs. per square inch, to the end 40 of the bell crank. It will be appreciated as this pressure is applied to the other end 32 of the bell crank which carries the chain guide is forced downwardly in the plane of the chain, against the stone to be cut, thereby permitting the bits to chip and abrade it in that plane as they travel therethrough at high velocity.

In FIG. 8 I have illustrated two positions of the chain 19, the dotted position being the extreme position when the ram has been extended to its maximum extent.

I may likewise desire to alter the plane of the saw so it may operate at other than a vertical position and at an angle thereto. In FIGS. 1 and 2 I have shown means for accomplishing this purpose and in FIG. 9 I have shown how the angle of cut may be altered. Such means may comprise hydraulic rams 50 connected to the upper frame 10a at 51, and to the lower frame 10b at 52. Suitable connections 53 and 54 to a source of hydraulic fluid (not shown) are provided. Brackets 55 are secured to the lower frame as shown in FIGS. 2, 3 and 9, for carrying pivots 56 which extend into cross-members 57 of the upper frame 10a. It will be readily appreciated that appropriate actuation of hydraulic cylinders 50 will cause the upper frame to pivot about the line between pivots 56 so that the entire upper frame as well as the plane of the saw may be varied as shown in FIG. 9.

In order to provide sufficient abrasive action to perform efficient cutting, I may use one or more of the bits shown in FIGS. 4 to 7, inclusive. In each case, the bit proper is composed of a hard abrasive material such as tungsten carbide 60, 60a and 60b mounted by clamping members 61 to the body portion 62 of links 38 which form alternate parts of chain 19.

It will be appreciated that the center bit 60 tends to chip and abrade a central groove in the stone and outer bits 60a and 60b chip and abrade two adjacent parallel grooves.

In operation, power is applied to the motor 20 and the chain brought up speed. The gearing should be such that the linear speed of the links should be of the order of 480 feet per minute but I have found it desirable to provide for variable speed between 360 to 1200 feet per minute. I accomplish this variation with a conventional transmission connected between the motor and gang pulley 23. The apparatus is then placed in the proper position and attitude for sawing, a hydraulic ram 43 actuated to push the end 40 of bell crank lever 31 forwardly. The force thus applied is exerted at the other end of the lever, which being integral with the chain guide pivots about shaft 15 and forces the same downwardly against the stone. I have found that pressures of the order of 5 to 10 tons per square inch are required for effective action on hard stone. Of course, very substantial power is required and as noted, a motor of the order of 250 H.P. is desirable although lower rated motors can sometimes be used. The combination of the bits traveling at high speed in the same course and being pressed downwardly against the stone at high pressure permits the bits to chip and abrade their respective grooves and in effect saw through the stone. The central bit 60 is desirably 1/8" to 3/8" longer than bits 60a and 60b. This cuts a central groove forming a ledge on each side which the other bits chip away as they follow through. I have found that using a 250 H.P. motor with a step up in gearing to produce a peripheral speed of 480 feet per minute of the bits, I can saw through more than 3 square feet of Indiana limestone per minute. The speed of rotation, power and pressure must of course be varied depending upon particular conditions, but I have found that with adequate power I can control pressure hydraulically through the mechanical advantage of my lever system to accomplish satisfactory results with any kind of stone.

Since the force on the chain are very substantial, I find that the pivot points tend to wear and the links tend to stretch after a period of use, and the chain lengthens. In order to meet this condition I find it desirable to mount an idler wheel 70 on a bearing 71 at the end of arm 72 which is pivotally mounted at 73 in chain guide 34. Secured to bearing 71 is a hydraulic cylinder 74, the end of which is secured as at 75 to chain guide 34. Suitable hydraulic connections (not shown) are provided to force wheel 70 upwardly to take up slack in the chain.

The pressure on idler 70 is preferably maintained constant during a given operation but may be increased if it is found that an undue amount of slack has accumulated.

It may be desirable during the operation to lubricate the work as by directing a stream of water in the groove in which the saw operates. Care should be taken, however, that the cooling fluid be maintained evenly in the same area in order not to create temperature differentials which will cause sudden contraction of the parts during the operation of the equipment.

In FIG. 10 I have shown a modification incorporating means for exerting pressure pulses upon the end of bell crank lever 31 in accordance with the system described and claimed in my patent application Ser. No. 370,997, filed May 28, 1964, and now abandoned. In this embodiment a hydraulic cylinder 140 is connected so that the ram exerts pressure against the arm 40b of a bell crank actuator similar to the bell crank 31 shown in FIGS. 1-9. The saw and operating mechanism is similar in other respects to that shown in FIGS. 1-9 and is mounted on a movable chassis 100.

In the illustrative embodiment of FIG. 10 hydraulic pressure is applied to cylinder 140 through a primary system comprising a pump 300, high pressure line 310, control 320, feed line 330, return lines 340 and 350, to the low side 380 of pump 300. A second hydraulic pump 400 feeds high pressure fluid through line 410 through a solenoid operated valve 420 into line 310. Return line 350 to the low side 380 of pump 300 is intermediately connected to the low side 360 of the secondary pump 400 and the low sides of each pump are interconnected through conduit 370. In the illustrative embodiment the pumps 300 and 400 provide three gallons per minute at 2000 lbs. per square inch and may be actuated by 5 H.P. motors.

In order to produce an intermittent superimposed pressure from the primary system I provide a motor 430 having a shaft to which is secured a cam 440 operating through a suitable cam follower on connecting rod 450 secured to a switch 460 in an electric circuit 470, 480 connected to the solenoid valve 420. The switch 460 is pivoted to open and close the circuit and to energize and deenergize the solenoid valve 420. By varying the speed of the motor 430 I can vary the rate at which the valve 420 opens and closes. When it opens, it opens the secondary system into the primary system and controls the frequency of the pulses superimposed upon the primary system. I have found that variations of between 30–60 cycles per minute are advantageous for most rock sawing, the precise frequency being dependent upon one or more of the known variables that must be reckoned with in this field of endeavor.

If desired I can hook up the pumps 300 and 400 so they are ganged together to provide a high flow rate to the load cylinder 140, as shown in my previous patent application above identified.

Having thus described my invention, I claim:

1. A stone sawing apparatus comprising, in combination, a frame, a transverse shaft mounted in said frame, a bell-crank lever surrounding said shaft for pivotal movement thereabout, a chain saw comprising a chain guide and chain links carrying linearly movable abrasive bits, said saw being mounted at one end of said lever, a driving sprocket for said saw, said sprocket being operatively mounted for rotation on said shaft, hydraulic means secured to the other end of said lever for forcing the saw against the stone, means operating on said hydraulic means for applying pulses thereto and means for simultaneously actuating said saw through rotation of said sprocket.

2. The apparatus as recited in claim 1 in which the pulses are supplied at a rate of from 30 to 60 per minute.

3. A stone sawing apparatus comprising, in combination, a frame, a transverse shaft mounted in said frame, a bell-crank lever surrounding said shaft for pivotal movement thereabout, a chain saw mounted on one end of said lever, a driving sprocket secured to said shaft for actuating said saw, a hydraulic system including a hydraulically operated piston secured to the other end of said lever for forcing the saw against the stone, a valve in said hydraulic system for varying the forces exerted on said lever in pulses, and power means connected to said shaft for simultaneously actuating said saw through rotation of said sprocket.

4. An apparatus according to claim 3 in which the valve in the hydraulic system is mechanically timed and electrically operated to control said pulses.

5. An apparatus according to claim 4 in which the pulses are applied at the rate of 30 to 60 per minute.

References Cited by the Examiner

UNITED STATES PATENTS

| | | | |
|---|---|---|---|
| 945,335 | 1/1910 | Levin | 229—83 |
| 1,142,874 | 6/1915 | Cannon | 74—242.11 |
| 1,283,036 | 10/1918 | Bahrenburg et al. | 299—39 X |
| 1,677,399 | 7/1928 | Morgan | 299—84 |
| 1,979,265 | 11/1934 | Holmes | 299—14 |
| 2,308,517 | 1/1943 | Konnerth | 299—14 |
| 2,746,492 | 5/1956 | De Hardit | 143—43.34 X |
| 2,937,055 | 5/1960 | Jerrit | 299—82 |

ERNEST R. PURSER, *Primary Examiner.*